United States Patent [19]

Sugasawa et al.

[11] 4,217,795

[45] Aug. 19, 1980

[54] ENGINE LOAD DETECTION SYSTEM FOR AUTOMATIC POWER TRANSMISSION

[75] Inventors: Fukashi Sugasawa; Nagayuki Marumo, both of Yokohama; Haruhiko Iizuka; Junichiro Matsumoto, both of Yokosuka, all of Japan

[73] Assignee: Nissan Motor Company, Limited, Yokohama, Japan

[21] Appl. No.: 863,140

[22] Filed: Dec. 22, 1977

[30] Foreign Application Priority Data

Jan. 6, 1977 [JP] Japan .................................. 52/530

[51] Int. Cl.² ............................................. B60K 41/04
[52] U.S. Cl. ...................................... 74/858; 74/859; 74/860; 74/863
[58] Field of Search ................. 74/860, 859, 858, 857; 123/32 EH, 32 EL, 198 F

[56] References Cited

U.S. PATENT DOCUMENTS

| 2,757,651 | 8/1956 | Winkler | 123/198 F X |
|---|---|---|---|
| 3,578,116 | 5/1971 | Nakajima et al. | 192/0.062 |
| 3,741,042 | 6/1973 | Ravenel | 74/866 X |
| 3,756,205 | 9/1973 | Frost | 123/198 F X |
| 4,061,055 | 12/1977 | Iizuka et al. | 74/859 X |
| 4,064,844 | 12/1977 | Matsumoto et al. | 123/32 EH X |
| 4,080,947 | 3/1978 | Iizuka | 123/198 F |
| 4,084,563 | 4/1978 | Hattori et al. | 123/119 EC |

*Primary Examiner*—Leslie Braun
*Attorney, Agent, or Firm*—Schwartz, Jeffery, Schwaab, Mack, Blumenthal & Koch

[57] ABSTRACT

In an automatic power transmission system for a multicylinder internal combustion engine wherein the intake vacuum is not available as a true indication of engine load, a detection system for detecting the level of engine load includes an electrical actuator responsive to a signal which faithfully represents the engine load to vary the pressure of fluid in the automatic power transmission system. One embodiment of the invention includes an intake air sensor, an engine speed sensor and a division circuit responsive to the outputs from both sensors to generate a signal representing the quantity of air inducted per unit time to represent the true indication of the engine load free from the effect of exhaust gas recirculation or other factors influencing the intake vacuum.

2 Claims, 5 Drawing Figures

ENGINE LOAD DETECTION SYSTEM FOR AUTOMATIC POWER TRANSMISSION

BACKGROUND OF THE INVENTION

This invention relates to automatic power transmission, and more specifically to a detection system for detecting the level of power required for an internal combustion engine to deliver in proportion to varying loads and electrically actuating a control valve to vary the fluid pressure to effect automatic power transmission.

The conventional automatic power transmission of torque converter type involves the use of an intake vacuum sensor which includes a diaphragm responsive to the vacuum of the intake manifold to vary its position. The diaphragm is operatively connected to a valve member which controls the pressure of fluid used in the automatic power transmission mechanism, so that the fluid pressure is caused to vary in proportion to the sensed vacuum in the intake manifold.

However, the recent introduction of exhaust gas recirculation for reduction of NOx components and cylinder disablement control for fuel economy has caused the intake vacuum to deviate from the value that corresponds to the true indication of the engine load. Therefore, the intake vacuum is not available as a faithful representation of the engine load. As a result, the conventional automatic power transmission does not operate satisfactorily for an engine equipped with exhaust gas recirculation or cylinder disablement.

SUMMARY OF THE INVENTION

An object of the invention is to provide a detection system for detecting the level of power required for an internal combustion engine by generating an electrical signal which is representative of the true indication of the engine load.

In one embodiment of the invention, an intake air sensor is provided to generate a signal representative of the mass flow rate of air inducted through the intake manifold and an engine RPM sensor for generating a signal representative of the engine speed. Further provided is a division circuit which computes the quotient by dividing the magnitude of the air flow representative signal by the magnitude of the speed representative signal so that the output of the division circuit is the quantity of air inducted per unit time or cylinder cycle, since the intake air flow is not under the influence of exhaust gas recirculation or the reduction of active cylinders by disablement control. For cylinder displacement control wherein certain of the fuel injectors of an electronic fuel injection system is disabled when the reduced power can adequately operate the vehicle, the output of the division circuit is multiplied by a factor representing the ratio of the maximum number of cylinders to the number of nondisabled or active cylinders. The signal so derived from the output of the division circuit or multiplier is used to vary the pressure of fluid in the automatic power transmission system.

BRIEF DESCRIPTION OF THE DRAWINGS

The invention will be further described in connection with the accompanying drawings, in which.

DESCRIPTION OF THE PREFERRED EMBODIMENTS

Figure 1:
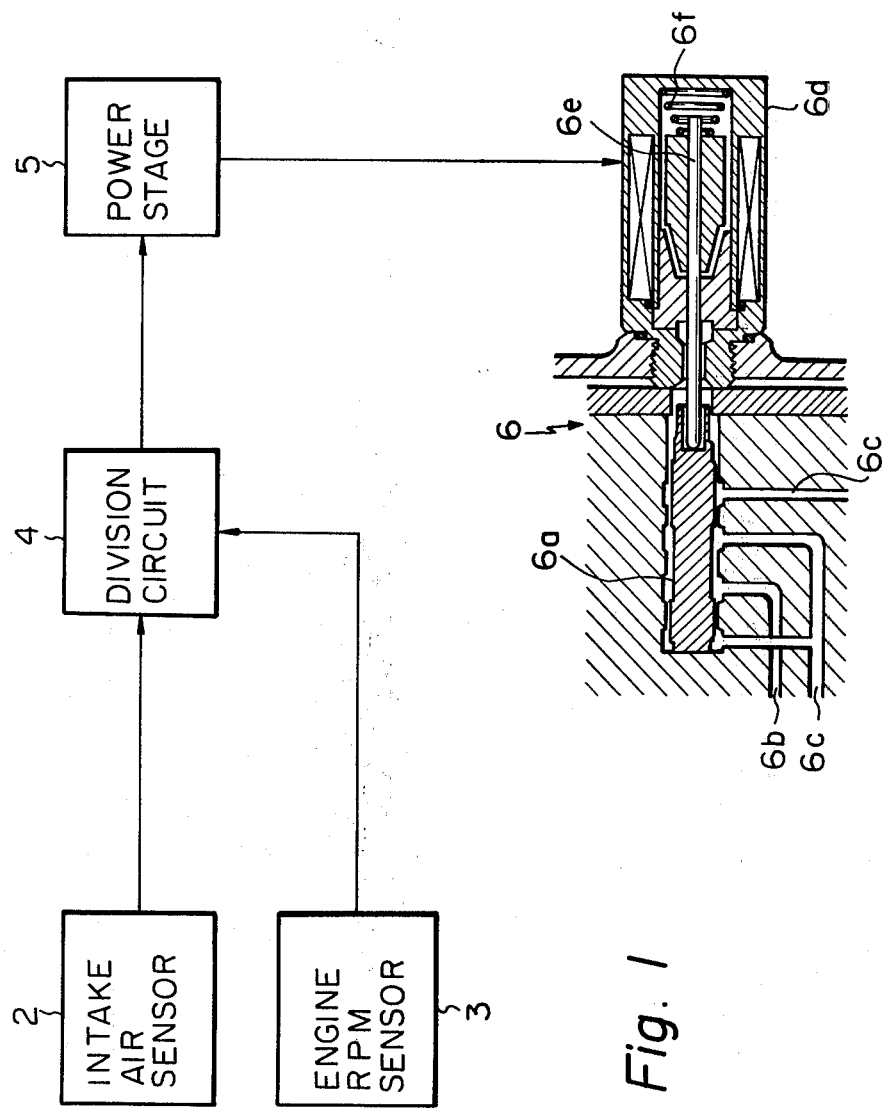
FIG. 1 is a block diagram of a first embodiment of the invention.

Referring now to FIG. 1 of the drawings, a first preferred embodiment of the invention is illustrated as comprising an intake air sensor 2, an engine RPM sensor 3 and an arithmetic division circuit 4 adapted to receive signals from both sensors to compute the quantity of air inducted per unit time. Specifically, the intake air sensor 2 generates a voltage signal representative of the mass air flow and which signal is divided arithmetically in the divider circuit 4 by a divisor represented by the signal from the engine RPM sensor 3. The output from the division circuit 4 thus represents engine's output power. The output of the division circuit 4 is amplified by a power stage 5 to a level sufficient to energize a solenoid 6d of a linear solenoid valve 6. The solenoid 6d includes a plunger 6e held in position by means of a spring 6f to engage a throttle valve member 6a. Numeral 6b designates a line pressure fluid passage and 6c designates throttle pressure fluid passage. The mechanical construction of the elements 6a through 6c of the solenoid valve 6 and their arrangement being well known in the art of automatic transmission, further description is unnecessary. Since the mass air flow as measured by the intake air sensor 2 is not adversely affected by the exhaust gas recirculation nor by cylinder disablement control, the output from the division circuit 4 and hence the linear movement of the solenoid plunger 6e can faithfully represent the engine power, so that the throttle pressure can be accurately controlled in accordance with the electrically sensed engine load.

Figure 2:
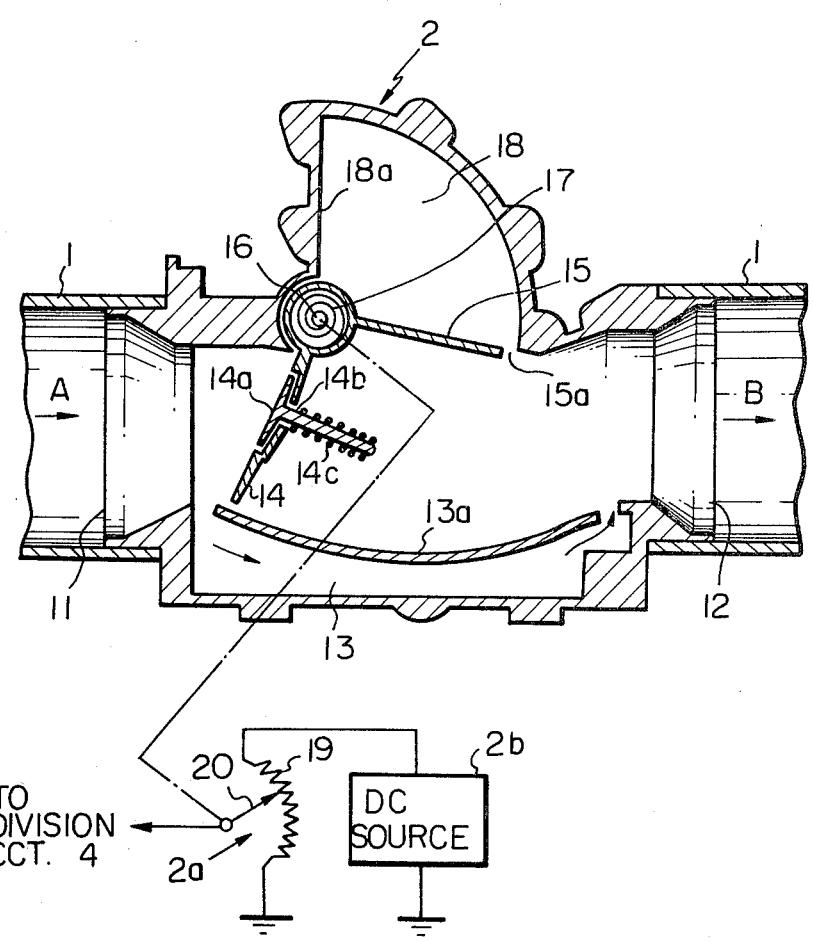
FIG. 2 is a detail of an intake air sensor of FIG. 1.

FIG. 2 illustrates a specific construction of the intake air sensor 2. The sensor 2 is shown disposed in an intake air passage 1 to receive air inducted through inlet 11 in the direction of arrow A and allow it to escape in the direction of arrow B through outlet 12. A flap 14 is rotatably mounted on a pivot 16 and normally urged in the clockwise direction by means of a spring 17 coiled around the pivot 16 so that with no air flow the lower end of the flap 14 comes to a position adjacent to the inlet 11 of the sensor. The interior of the sensor 2 is partitioned by an arcuate member 13a to form a bypass passage 13 to allow certain of the inducted air to bypass the main passage of the sensor 2. In proportion to the quantity of air inducted through inlet port 11, the flap 14 rotates about pivot 16 counterclockwise so that its angular position represents the amount of air inducted. To the pivot 16 is operatively connected a slider 20 of a well known potentiometer 2a with its slider in electrical slidable contact with a resistor 19 which is electrically connected between a DC voltage source 2b and ground. The potentiometer slider 20 rotates with the sensor flap 14 to vary its angular position with respect to the resistor 19 so that the voltage developed across the slider 20 and ground represents the quantity of inducted air for application to the division circuit 4.

The sensor 2 is formed with a chamber 18 for damping the oscillatory movements of the flap 14. Numeral 15 refers to a damping member which is integrally connected with the flap 14. The air inside of the chamber 18 is compressed by the damping member 15 when the flap 14 is caused to turn rapidly in the counterclockwise direction, so that the compressed air is allowed to escape through an air gap 15a between the inner wall of the chamber 18 and the end of the damper 15. The rapid movement of flap 14 in the clockwise direction is also prevented by the sucking action of the chamber 18 as it draws in air through the air gap 15a when the damper 15 recedes from the end wall 18a of the chamber 18.

Additional damping action is provided by means of an inertial member 14a received in an air escape hole 14b provided in the flap 14. A coil spring 14c is mounted to hold the inertial member 14a in position to close the hole 14b. A sudden counterclockwise movement of the flap 14 will cause the hole 14b to open because of the tendency of the inertial member 14a to remain stationary with respect to the flap 14, so that a rapid increase in air mass is damped as it passes through the escape hole 14b.

Cylinder disablement control is known in the art as a means of achieving fuel economy by inactivating certain of the cylinders when reduced engine power can adequately operate the engine. Cylinder disablement can be effected by shutting off the inlet valve of the disabled cylinder of a carburetor equipped engine or by cutting off the injection pulse of an electronic fuel injection system. In the case of the carburetor equipped engine, the amount of intake air as sensed by the intake air sensor 2 will be inducted to the active cylinders, while in the latter case the inlet valve of the disabled cylinder is left open to draw in and out the intake air without combustion so that the output of the sensor 2 is no longer representative of the air quantity that is actually utilized in combustion.

Figure 3:
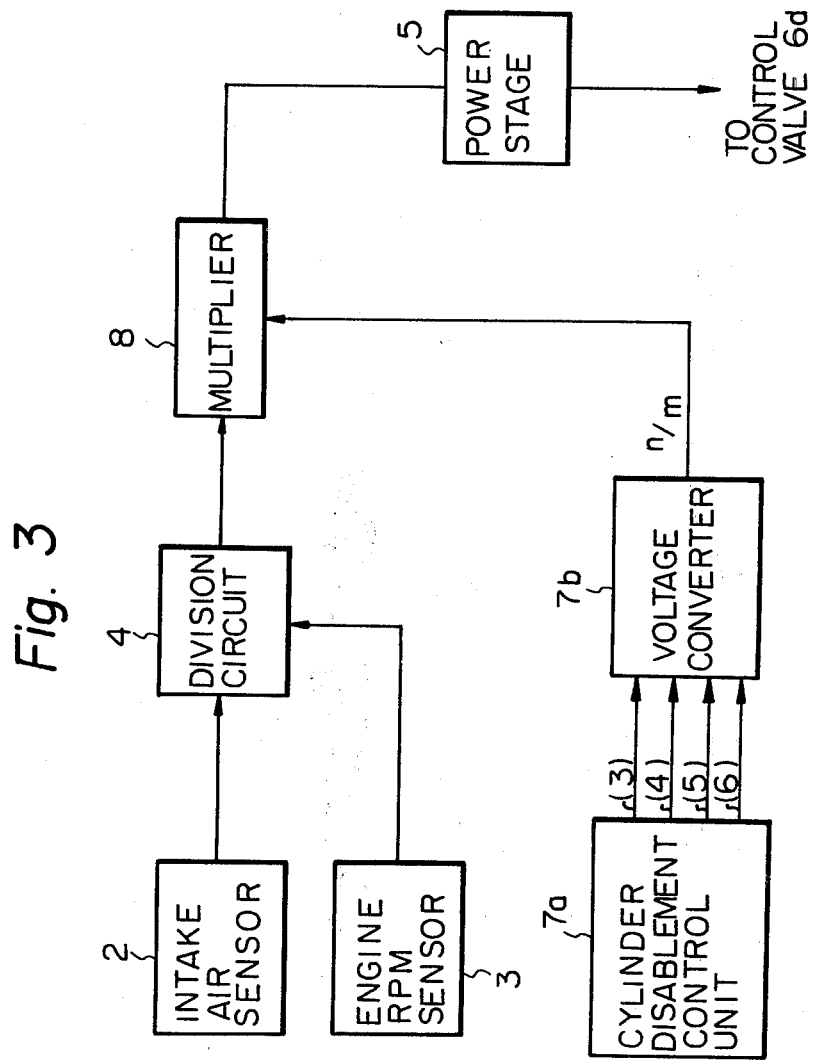
FIG. 3 is a modification of the embodiment of FIG. 1.

FIG. 3 illustrates a modification of FIG. 1 in which cylinder disablement control is provided for an electronically fuel injected internal combustion engine. The embodiment of FIG. 3 is generally similar to the previous embodiment with the exception that a cylinder disablement control unit 7a and a voltage converter 7b are additionally provided to modify the output of the division circuit. The cylinder disablement control unit 7a is adapted to disable certain of the cylinders of the engine when reduced engine output power can operate the vehicle adequately. The detail of the disablement control unit is disclosed in U.S. Application Ser. No. 724,082 filed on Sep. 16, 1976 assigned to the same assignee as the present application. The control circuit 7a delivers a "1" logic output on one of its output terminals (3), (4), (5) and (6), the numbers in the parentheses indicating the number of activated cylinders. At light load a maximum of three cylinders are deactivated while at full load no disablement occurs. The "1" logic output from the control unit 7a is applied to the voltage converter 7b where the input signal is converted into a specified voltage level proportional to the number of activated cylinders. Assuming that the number of cylinders equipped with the engine is "m" and the number of activated cylinders "n", then the output from the voltage converter 7b represents the ratio "n/m". The output from the voltage converter 7b is applied to a multiplier 8 where it multiplies the output from the division circuit 4 by the ratio "n/m". Therefore, the engine power represented by the output of the division circuit 4 is reduced in proportion to the number of disabled cylinders, and thus the output of the multiplier 8 is a true indication of the output power of the electronically fuel injected engine where the inlet valve of the cylinder is allowed to remain open when it is disabled.

Figure 4:
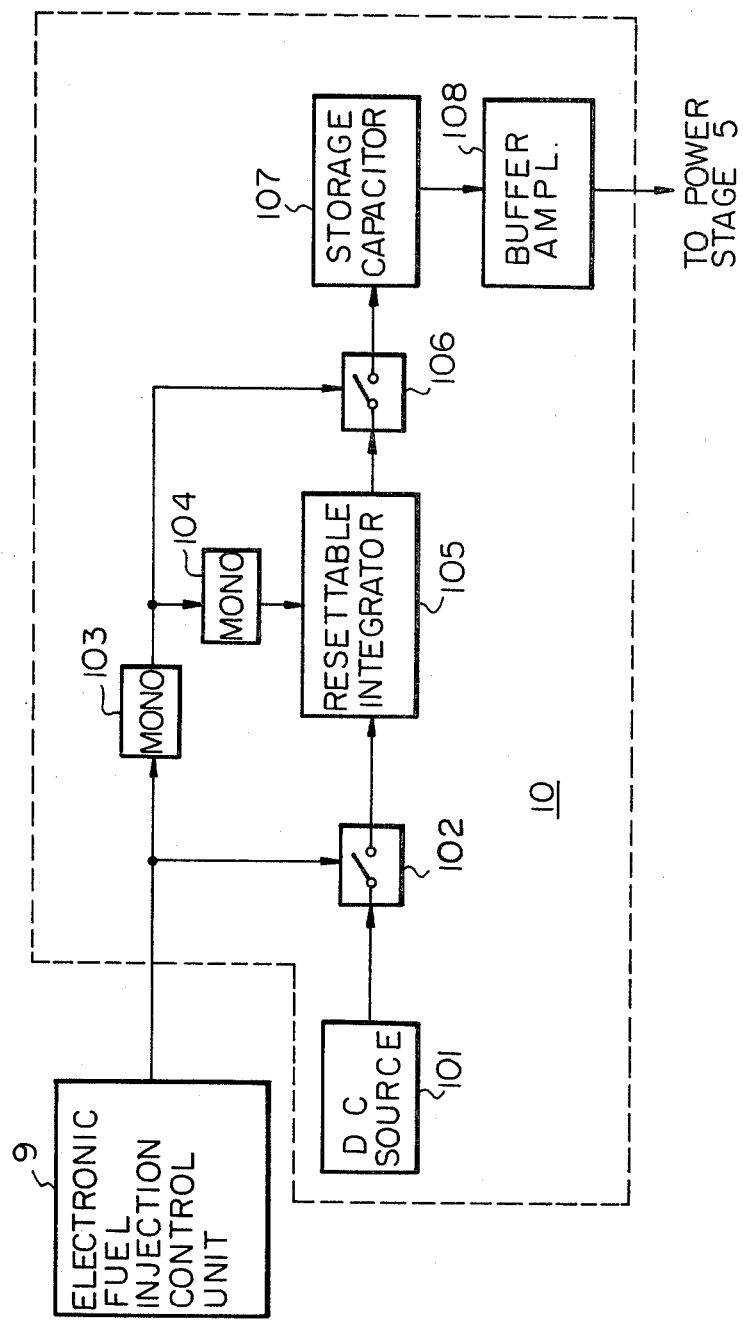
FIG. 4 is a schematic circuit diagram of a second embodiment of the invention.

The invention further contemplates to utilize the injection pulse of an electronic fuel injection system as a signal indicating the engine output power since the width of the injection pulse is proportional to the engine power. FIG. 4 illustrates an embodiment which includes a pulse-width-to-voltage converter 10 to convert the width of the pulse supplied from an electronic fuel injection control unit 9 into a voltage signal. The converter 10 comprises a resettable integrator 105 which receives a DC voltage from a source 101 through an electronic switch 102 which closes in response to the presence of an injection pulse from the control unit 9. The trailing edge of the injection pulse is sensed by a monostable multivibrator 103 to momentarily close an electronic switch 106 to transfer the output of the integrator 105 to a storage capacitor 107. Since the integrator output increases in the presence of the injection pulse, the voltage stored in the capacitor 107 is proportional to the length of the applied injection pulse. A monostable multivibrator 104 senses the trailing edge of the output of the monostable 103 to reset the integrator 105. The voltage across the storage capacitor 107 is amplified by a buffer amplifier 108 and coupled to the power stage 5 for further signal amplification.

Figure 5:
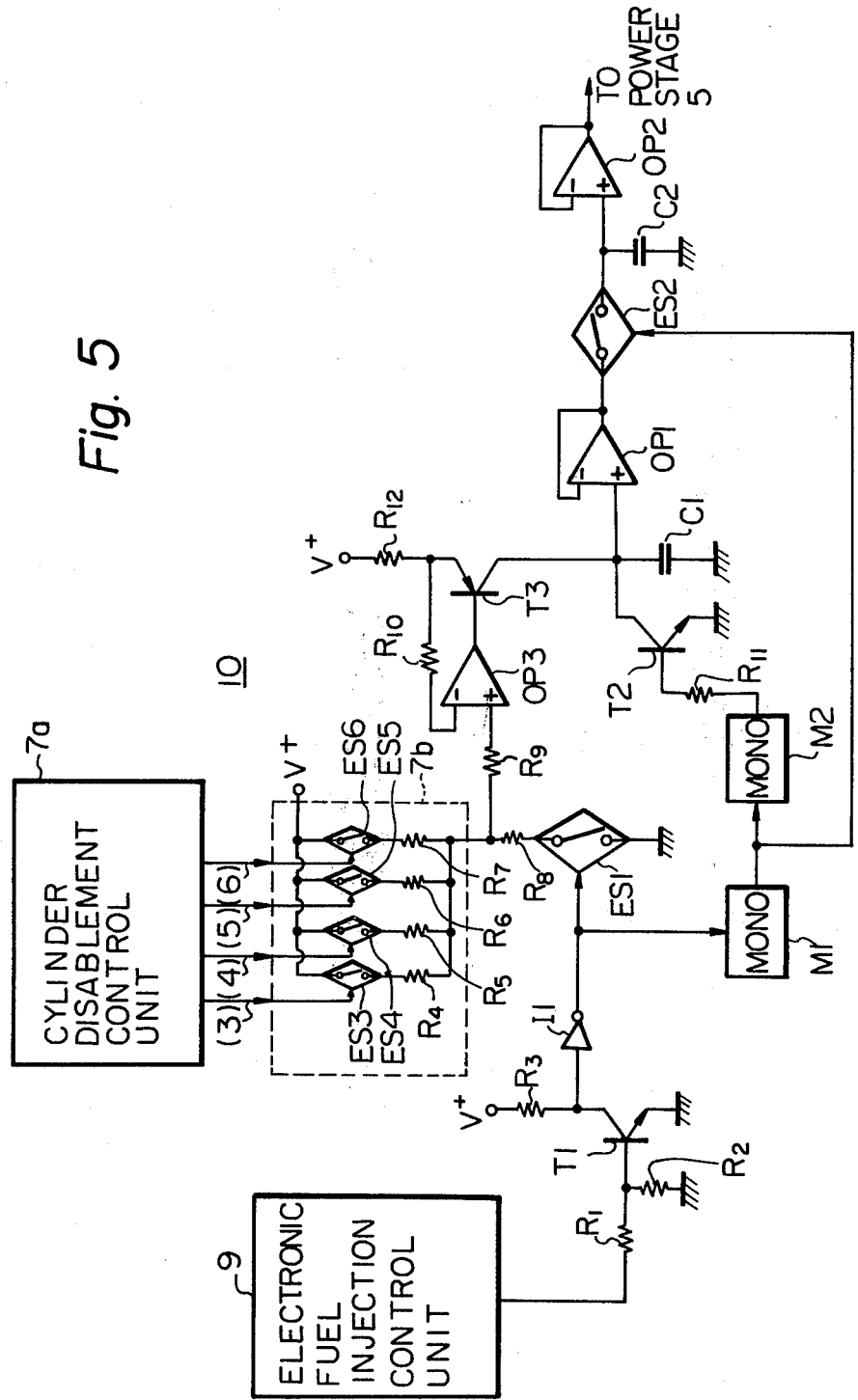
FIG. 5 is a modification of the embodiment of FIG. 4.

A modification of the embodiment of FIG. 4 is illustrated in FIG. 5 in which the cylinder disablement control unit 7a of FIG. 3 is employed in conjunction with the electronic fuel injection control unit 9. The pulse-width-to-voltage converter 10 of FIG. 5 includes a transistor T1 whose base electrode is connected to a junction of resistors R1 and R2 connected in a series circuit between the output of the control unit 9 and a common ground. The collector of transistor T1 develops a voltage inverse in polarity to the polarity of the output from the control unit 9. The collector of transistor T1 is connected by an inverter I1 to the control gate of an electronic switch ES1 and also to a monostable multivibrator M1 whose function is to detect the trailing edge of the injection pulse. The inverted output from the inverter I1 activates the switch ES1 to close its contacts to couple the ground potential to the noninverting input of an operational amplifier OP3 through resistors R8 and R9. The output terminals of the cylinder disablement control unit 7a are connected to the voltage converter 7b comprising electronic switches ES3 through ES6 and resistors R4 and R7 respectively connected in series with switches ES3 through ES6 to a voltage supply V+. These resistors are connected together to the junction between the resistors R8 and R9. The control gates of the switches ES3 to ES6 are connected to the output terminals (3) through (6) of the disablement control unit 7a, respectively. A logic "1" output at one of the terminals of the control unit 7a activates its associated electronic switch to couple the voltage V+ through the associated resistor to the junction of resistors R8 and R9. To provide proportional scaling of the voltage to be applied to the noninverting input of operational amplifier OP3 to the number of activated cylinders, the following relations should exist:

$$1 - \frac{R8}{R4 + R8} = \frac{6}{5}(1 - \frac{R8}{R5 + R8})$$

$$= \frac{6}{4}(1 - \frac{R8}{R6 + R8})$$

$$= \frac{6}{3}(1 - \frac{R8}{R7 + R8})$$

The operational amplifier OP3 has its inverting input connected by a resistor R10 to the emitter of a transistor T3 whose base is connected to the output of the operational amplifier OP3. The emitter of transistor T3 is connected by a load resistor R12 to the voltage supply V+ and the collector is connected to ground by a storage capacitor C1. The capacitor C1 is charged at a constant rate by a current supplied from the collector of transistor T3 and this charging current is proportional to the voltage applied to the noninverting input of the amplifier OP3 so that the voltage across the capacitor C1 increases linearly with time in the presence of the injection pulse to a level proportional to the number of cylinders to be activated.

A short circuit path is provided across the storage capacitor C1 by the collector-emitter path of a transistor T2 whose base is connected to the output of a monostable multivibrator M2 connected to the output of monostable M1.

The voltage across the storage capacitor C1 is coupled to an electronic switch ES2 through buffer amplifier formed by an operational amplifier OP1. The switch ES2 is responsive to the presence of the output of monostable M1 to connect the buffer amplifier output to a second storage capacitor C2 so that the energy stored in capacitor C1 is transferred at the trailing edge of an injection pulse from the control unit 9. The trailing edge of the output pulse from monostable M1 is detected by the monostable M2 to turn transistor T2 to the ON state, whereby the storage capacitor C1 is discharged at the end of the transfer of energy to the capacitor C2. The voltage stored on capacitor C2 is coupled to the power stage 5 through a buffer amplifier OP2. Therefore, the voltage developed across capacitor C2 appears at the trailing edge of each injection pulse and the voltage level is representative of the power the engine is required to deliver.

What is claimed is:

1. A system for detecting the level of power required for a multicylinder internal combustion engine of a wheeled vehicle to deliver, the vehicle including an automatic power transmission mechanism for transmission of power from the engine to the vehicle wheels in response to varying loads of the engine, the transmission mechanism including means for hydraulically varying fluid pressure in response to the detected level of power, said detecting system comprising:

means for generating a first signal representative of mass flow of air through an intake manifold of said engine;

means for generating a second signal representative of the speed of said engine;

means for arithmetically dividing the magnitude of said first signal by the magnitude of the second signal to provide an output signal representative of the quantity of air passing through said intake manifold per unit time; and an electromechanical valve assembly responsive to said output signal to control said hydraulic fluid pressure varying means;

said engine including an electronic fuel injection system, and means connected to the fuel injection system for converting the width of an injection pulse applied thereto into a voltage signal of which the magnitude represents the width of the applied pulse, and said injection pulse width converting means comprising:

a resettable integrator;

a first electronic switch responsive to the presence of said injection pulse to apply a DC voltage to said integrator to allow its output to increase with time;

a first monostable multivibrator responsive to the trailing edge of said injection pulse to provide a first output pulse;

a storage capacitor;

a second electronic switch responsive to said first output pulse to supply said capacitor with the output of said integrator;

a second monostable multivibrator responsive to the trailing edge of said first output pulse to reset said integrator; and a buffer amplifier connected to said storage capacitor.

2. A system as claimed in claim 1, wherein said engine further includes means for disabling certain of the fuel injectors in response to varying loads of the engine, further comprising means for varying said DC voltage in proportion to the ratio of the maximum number of the cylinders of said engine to the number of the cylinders associated with the nondisabled fuel injectors.

* * * * *